US009002972B2

(12) United States Patent
Meyer et al.

(10) Patent No.: US 9,002,972 B2
(45) Date of Patent: Apr. 7, 2015

(54) SYSTEMS AND METHODS FOR SHARING THE RESULTS OF COMPUTING OPERATIONS AMONG RELATED COMPUTING SYSTEMS

(75) Inventors: James Meyer, Van Meter, IA (US); David Buches, Westlake Village, CA (US); Bruce McCorkendale, Manhattan Beach, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 658 days.

(21) Appl. No.: 12/696,970

(22) Filed: Jan. 29, 2010

(65) Prior Publication Data

US 2011/0191341 A1    Aug. 4, 2011

(51) Int. Cl.
G06F 15/167    (2006.01)
G06F 15/16    (2006.01)
G06F 21/50    (2013.01)

(52) U.S. Cl.
CPC ..................................... *G06F 21/50* (2013.01)

(58) Field of Classification Search
CPC .... H04L 63/145; H04L 63/1408; H04L 63/20
USPC ......................................... 709/203–204, 213
See application file for complete search history.

(56) References Cited

U.S. PATENT DOCUMENTS 5,067,099 A * 11/1991 McCown et al. ............. 702/183
5,261,051 A * 11/1993 Masden et al. ................ 711/152
5,392,446 A * 2/1995 Tower et al. .................... 712/11
5,960,170 A * 9/1999 Chen et al. ................. 714/38.14
7,310,817 B2 * 12/2007 Hinchliffe et al. ............ 709/223
7,523,487 B2 * 4/2009 Muhlestein ...................... 726/3
7,797,748 B2 * 9/2010 Zheng et al. .................. 709/224
2004/0172551 A1    9/2004 Fielding et al.
2005/0132205 A1 * 6/2005 Palliyil et al. ................. 713/188
2008/0134177 A1    6/2008 Fitzgerald et al.
2008/0263658 A1    10/2008 Michael et al.
2008/0271016 A1    10/2008 Chess et al.

(Continued)

FOREIGN PATENT DOCUMENTS

WO        WO 99/27450        6/1999

OTHER PUBLICATIONS

Youhui Zhang; Virtual-Machine-Based Intrusion Detection on File-Aware Block Level Storage; http://www.computer.org/portal/web/csdl/doi/10.1109/SBAC-PAD.2006.32; Nov. 5, 2009.

(Continued)

*Primary Examiner* — Minh-Chau Nguyen
(74) *Attorney, Agent, or Firm* — ALG Intellectual Property, LLC (57) ABSTRACT

A computer-implemented for sharing the results of computing operations among related computing systems may include: 1) identifying a need to perform a computing operation on a file, 2) identifying a unique identifier associated with the file, 3) determining, by using the unique identifier to query a shared store that is shared by a group of related computing systems, that at least one computing system within the group of related computing systems has previously performed the computing operation on an instance of the file, and then 4) retrieving the results of the computing operation from the shared store instead of performing the computing operation. Various other methods, systems, and computer-readable media are also disclosed.

20 Claims, 7 Drawing Sheets

(56) References Cited

U.S. PATENT DOCUMENTS

| | | | |
|---|---|---|---|
| 2009/0158432 A1 | 6/2009 | Zheng et al. | |
| 2009/0241194 A1 | 9/2009 | Thomas | |
| 2010/0071064 A1* | 3/2010 | Weber | 726/24 |
| 2010/0313269 A1* | 12/2010 | Ye | 726/24 |
| 2012/0198553 A1* | 8/2012 | Suginaka et al. | 726/24 |

OTHER PUBLICATIONS

Tom Liston; On the Cutting Edge: Thwarting Virtual Machine Detection; http://www.intelguardians.com; 2006.

International Search Report and Written Opinion received in PCT Application No. PCT/US2010/062185 on May 3, 2011.

Uluski, Derek; "Real time anti-virus for a virtualized environment"; Thesis for Master Science; Jan. 1, 2008; pp. I-XI, 1-85; Department of Electrical and Computer Engineering, Northeastern University.

Oberheide, Jon et al.; "CloudAV: N-Version Antivirus in the Network Cloud"; 17th USENIX Security Symposium; Aug. 1, 2008; pp. 91-106, San Jose, CA.

Danny Quist, et al.; Detecting the Presence of Virtual Machines Using the Local Data Table; Offensive Computing; Dec. 12, 2005; http://www.offensivecomputing.net.

Dan Upton; Detection and Subversion of Virtual Machines; CS 851—Virtual Machines; May 2006; University of Virginia.

Jason Franklin, et al.; Towards Sound Detection of Virtual Machines; Botnet Detection, Advances in Information Security; Oct. 23, 2007; pp. 89-116; vol. 36; Springer; Springer eBook.

Tal Garfinkel, et al.; A Virtual Machine Introspection Based Architecture for Intrusion Detection; Internet Society's 2003 Symposium on Network and Distributed System Security; 2003; Stanford University.

William E. Sobel, et al; Systems and Methods for Sharing the Results of Analyses Among Virtual Machines; U.S. Appl. No. 12/826,122, filed Jun. 29, 2010.

International Search Report received in International Application No. PCT/US2011/036558; Aug. 19, 2011.

Written Opinion of the International Searching Authority received in International Application No. PCT/US2011/036558; Aug. 19, 2011.

Written Opinion of the International Searching Authority received in PCT Application No. PCT/US2010/062185 on Jul. 31, 2012.

* cited by examiner

| Hash | Most-Recent Scan Date | Virus Definition Set | Classification | Classification Rationale | Reputation |
|---|---|---|---|---|---|
| 0xEFCDAB89 | 1/2/2010 | 3.1294 | Malicious | Signature Match | N/A |
| 0x98BAD748 | 11/12/2009 | 2.9234 | Legitimate | | 98% |
| 0x828AB998 | 6/21/2009 | 2.7574 | Legitimate | | N/A |
| 0xBC290F22 | 1/12/2010 | | Untrusted | Low reputation | 9% |

File-Attribute Database
120

SYSTEMS AND METHODS FOR SHARING THE RESULTS OF COMPUTING OPERATIONS AMONG RELATED COMPUTING SYSTEMS

BACKGROUND

Related computing systems, such as virtual machines running on a common host machine or physical computing devices connected to a common network, may often encounter instances of the same file or files. For example, a high percentage of files within virtual machines that run the same operating system or service pack and/or originate from the same base image may be identical. Because of this, related computing systems may redundantly perform identical or similar resource-consuming computing operations on instances of the same file.

For example, if 30 virtual machines that originate from the same base image and run on a common host are instructed to perform a periodic malware scan of all files, these virtual machines are likely to collectively perform 30 different malware scans on instances of files that are shared between the virtual machines (such as common system or application files), all with similar or identical results. In addition to wasting computing resources on such redundant operations, this scenario may also swamp or overrun the resources of the underlying host machine, potentially resulting in decreased performance and/or system failure. As such, the instant disclosure identifies a need for identifying common content among a group of related computing systems and then using this knowledge to share the results of computing operations performed on this common content among the related computing systems.

SUMMARY

As will be described in greater detail below, the instant disclosure generally relates to systems and methods for sharing the results of computing operations (such as malware or data-loss-prevention scans) performed on shared or common files among related computing systems. In one example, one or more of the systems described herein may accomplish such a task by: 1) identifying a need to perform a computing operation (such as a malware or data-loss-prevention scan) on a file, 2) identifying a unique identifier (such as a hash) associated with the file, 3) determining, by using the unique identifier to query a shared store that is shared by a group of related computing systems (such as a group of virtual machines running on a host machine or a group of physical computing devices connected to a common network), that at least one computing system within the group of related computing systems has previously performed the desired computing operation on an instance of the file, and then 4) retrieving the results of the computing operation from the shared store instead of again performing the desired computing operation.

In one example, the systems described herein may identify a unique identifier associated with the file by creating a hash of the file or by retrieving a hash of the file from a local cache or store. In some examples, the file hashes contained within this local cache or store may persist so long as the file associated with each hash remains static or unchanged. For example, if the systems described herein determine that a file has been modified or changed, then these systems may clear or delete the file hash for this file from the local cache or store.

In some examples, the computing-operation results contained within the shared store may include information that identifies, among other elements, a classification assigned to the file during a malware analysis, at least one rationale for the classification assigned to the file during the malware analysis, and/or at least one virus definition set or heuristic used when performing the malware analysis. Depending on the type of computing systems involved, this shared store may represent at least a portion of a network-attached storage device, a storage area network, a file server, a cloud-based storage device, and/or a secured partition of a local storage device managed by a hypervisor. In some examples, this shared store may be indexed using file hashes.

Since the computing resources required to hash a file may equal or exceed the computing resources required to share the results of a computing operation performed in connection with the file (e.g., hashing a file may consume as much or more computing resources than performing a malware scan on the same file), in some examples the systems described herein may only share the results of computing operations performed on files that are unlikely to change frequently and/or that are likely to be located on or encountered by additional computing systems within the group of related computing systems. For example, if the systems described herein determine that a file is likely to change frequently (thus potentially requiring the frequent generation of new hashes for the file) and/or that additional instances of the file are unlikely to be encountered by additional computing systems within the group, then the systems described herein may refrain from hashing the file and/or attempting to share the results of computing operations performed on the file since the computing resources required to share these results may equal or exceed the computing resources collectively saved by the group by sharing these results.

In one example, if the systems described herein determine that the shared store indicates that none of the related computing systems within the group have previously performed the desired computing operation on the file in question, then the systems described herein may perform the desired computing operation on the file in question and then update the shared store with the results of the computing operation.

As detailed below, by storing the results of resource-consuming computing operations (such as malware scans or file-reputation lookups) performed on common or shared files within a store that is shared by a group of related computing systems, the systems and methods described herein may enable related computing systems (such as a group of virtual machines running on a host machine or a group of physical computing devices connected to a common network) to share and reuse the results of such computing operations. As such, these systems and methods may reduce the number of redundant computing operations performed on files that are shared in common among the group, potentially reducing the amount of computing resources collectively consumed by the group.

Moreover, by only sharing the results of computing operations performed on instances of files that are likely to be encountered by other computing systems within the group and/or that are unlikely to frequently change, the systems and methods described herein may attempt to ensure that the computing resources required to share the results of computing operations performed on such files do not equal or exceed the computing resources collectively saved by sharing the results of such computing operations.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for sharing the results of computing operations among related computing systems. The following will provide, with reference to FIGS. 1-3 and 5, detailed descriptions of exemplary systems for sharing the results of computing operations among related computing systems. Detailed descriptions of corresponding computer-implemented methods will also be provided in connection with FIG. 4. In addition, detailed descriptions of an exemplary computing system and network architecture capable of implementing one or more of the embodiments described herein will be provided in connection with FIGS. 6 and 7, respectively.

Figure 1:
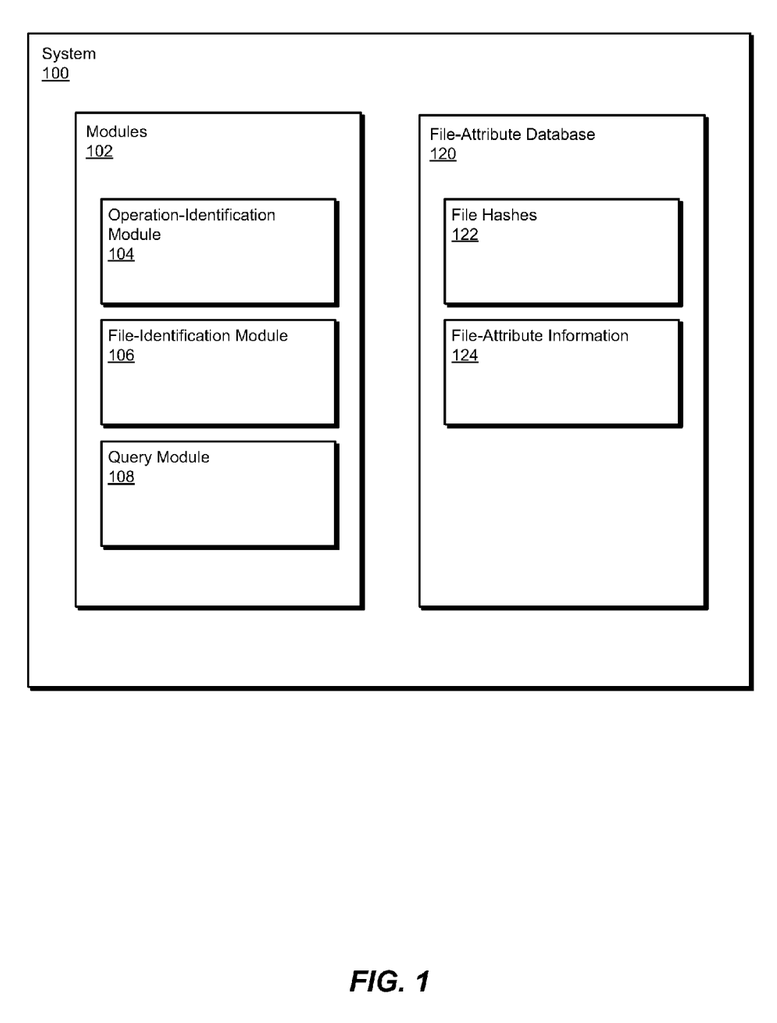
FIG. 1 is a block diagram of an exemplary system for sharing the results of computing operations among related computing systems.

FIG. 1 is a block diagram of an exemplary system 100 for sharing the results of computing operations among related computing systems. As illustrated in this figure, exemplary system 100 may include one or more modules 102 for performing one or more tasks. For example, and as will be explained in greater detail below, exemplary system 100 may include an operation-identification module 104 programmed to identify the need to perform a computing operation on a file. Exemplary system 100 may also include a file-identification module 106 programmed to identify a unique identifier associated with the file.

In addition, and as will be described in greater detail below, exemplary system 100 may include a query module 108 programmed to: 1) determine, by using the unique identifier to query a shared store that is shared by a group of related computing systems, that at least one computing system within the group of related computing systems has previously performed the computing operation on an instance of the file in question and 2) retrieve the results of the computing operation from the shared store instead of performing the computing operation. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIGS. 2 and 3 (e.g., virtual machines 202(1)-(N) and computing devices 302(1)-(N)), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include a file-attribute database 120. In one embodiment, and as will be explained in greater detail below, file-attribute database 120 may be configured to store one or more file hashes 122 and file-attribute information 124. File-attribute database 120 may represent portions of a single database or computing device or a plurality of databases or computing devices. For example, file-attribute database 120 may represent a portion of local stores 212(1)-(N) and/or shared store 216 in FIG. 2, local stores 303(1)-(N) and/or shared store 306 in FIG. 3, computing system 610 in FIG. 6, and/or portions of exemplary network architecture 700 in FIG. 7. Alternatively, file-attribute database 120 in FIG. 1 may represent one or more physically separate devices capable of being accessed by a computing device, such virtual machines 202(1)-(N) in FIG. 2, computing devices 302(1)-(N) in FIG. 3, computing system 610 in FIG. 6, and/or portions of exemplary network architecture 700 in FIG. 7.

Figure 2:
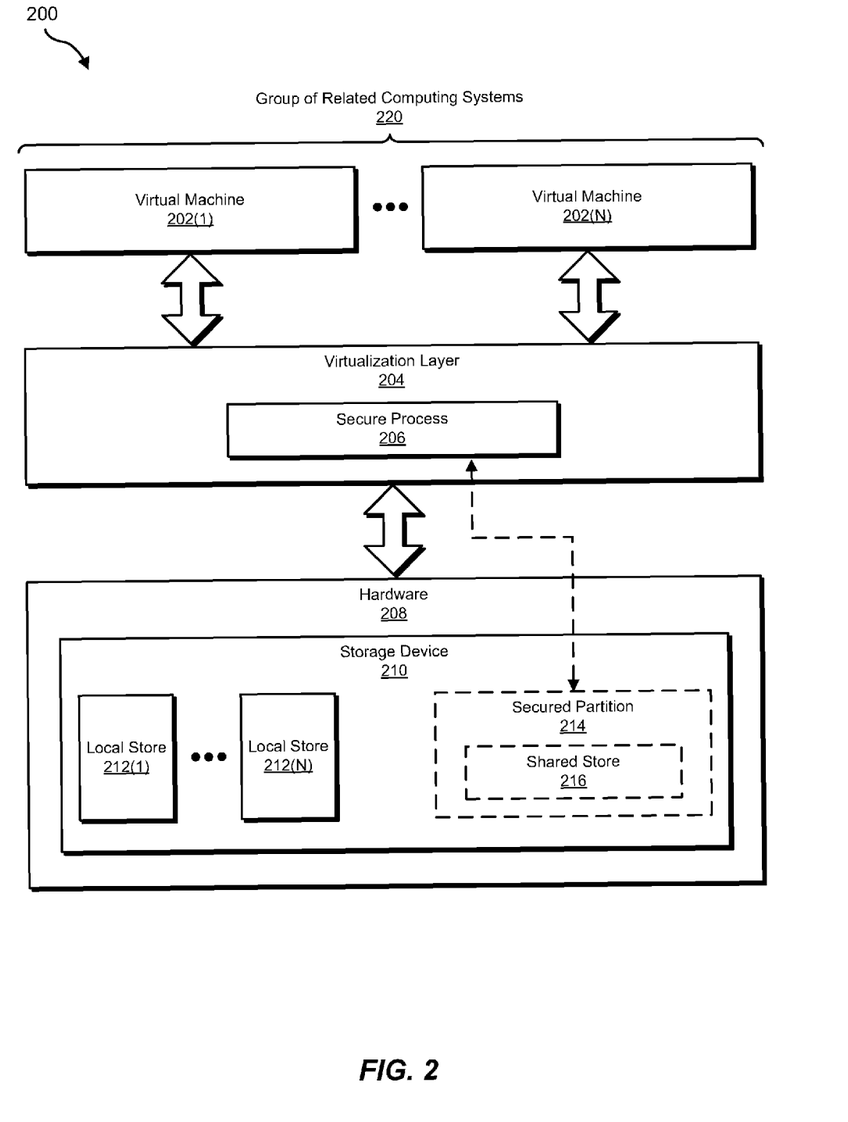
FIG. 2 is a block diagram of an additional exemplary system for sharing the results of computing operations among related computing systems.

Exemplary system 100 in FIG. 1 may be deployed in a variety of ways. In one example, all or a portion of exemplary system 100 may represent portions of an exemplary host machine 200 in FIG. 2. As shown in FIG. 2, host machine 200 may include a plurality of virtual machines 202(1)-(N) in communication with a set of hardware 208 via a virtualization layer 204. In one embodiment, and as will be described in greater detail below, modules 102 in FIG. 1 may program each of virtual machines 202(1)-(N) to: 1) identify a need to perform a computing operation (such as a malware scan) on a file within the virtual machine, 2) identify a unique identifier (such as a file hash) associated with the file, 3) determine, by using the unique identifier to query shared store 216 (which may, as will be explained below, be shared by virtual machines 202(1)-(N)), that an additional virtual machine within group 220 has previously performed the desired computing operation on an instance of the file, and then 4) retrieve the results of the computing operation from the shared store instead of again performing the computing operation.

Host machine 200 generally represents any type or form of physical computing device capable of hosting one or more virtual machines. Examples of host machine 200 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Virtual machines 202(1)-(N) generally represent any type or form of virtualized or emulated computing machine that is capable of reading computer-executable instructions. Examples of virtual machines 202(1)-(N) include, without limitation, system virtual machines, process virtual machines, or any other suitable virtual or emulated computing device. In the example illustrated in FIG. 2, virtual machines 202(1)-(N) may access the underlying hardware 208 of host machine 200 via virtualization layer 204, which may abstract and manage the computing resources of host machine 200.

As illustrated in FIG. 2, hardware 208 may include, among other elements, at least one storage device. In some embodiments, virtualization layer 204 may abstract hardware 208 into a plurality of local stores 212(1)-(N) for each of virtual machines 202(1)-(N). As will be described in greater detail below, local stores 212(1)-(N) may be used to store, among other information, cached copies of files hashes that may be used to query shared store 216.

Shared store 216 generally represents any type or form of physical or virtualized storage that may be shared or accessed by a group of related computing systems, such as virtual machines 202(1)-(N) in FIG. 2. In some examples, shared store 216 may contain or comprise a file-attribute database (such as file-attribute database 120 in FIGS. 1 and 5) that may contain, for each of a plurality of files encountered by a group of computing systems (such as virtual machines 202(1)-(N)): 1) a hash of the file, 2) the results of at least one computing operation performed in connection with the file (such as a classification assigned to the file during a malware analysis, at least one rationale for the classification assigned to the file during the malware analysis, at least one virus definition set or heuristic used when performing the malware analysis, or the like), 3) the date of at least one computing operation performed in connection with the file (such as the date of the most-recent malware scan performed on the file), and/or 4) any other potentially useful information that may be shared among related computing systems.

Any type or form of group of related computing systems may share or access a shared store. In one example, a plurality of virtual machines running on a common host computing device (such as the group of related computing systems 220 running on host machine 200 in FIG. 2) may access a shared store (such as shared store 216). For example, as illustrated in FIG. 2, virtual machines 202(1)-(N) may access shared store 216 located within a secured partition 214 via a secure process 206 (managed, for example, by a hypervisor) running within virtualization layer 204.

Figure 3:
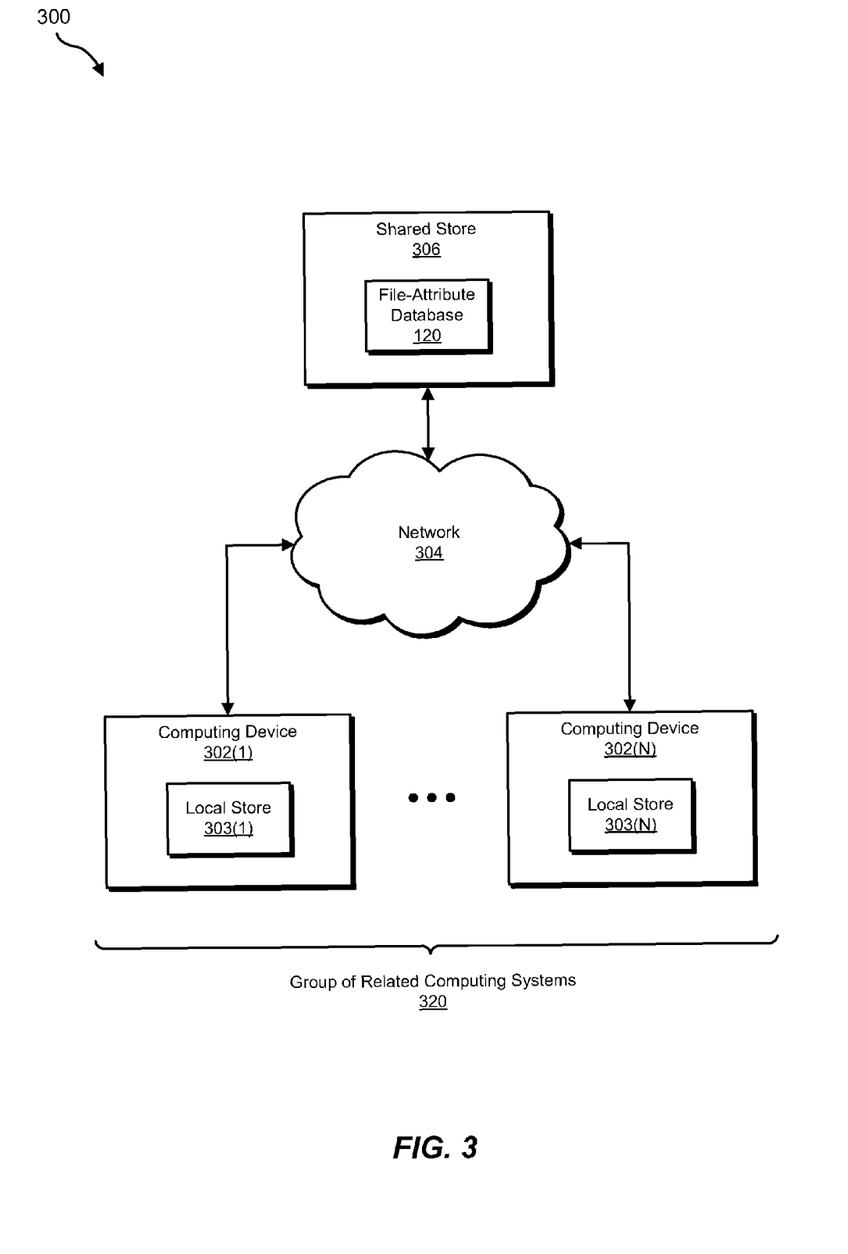
FIG. 3 is a block diagram of an additional exemplary system for sharing the results of computing operations among related computing systems.

In another example, a plurality of physical machines located within a common network (such as the group of related computing systems 320 in FIG. 3 in communication via network 304) may access a shared store. For example, as illustrated in FIG. 3, computing devices 302(1)-(N) may access a shared store 306 via a network 304. In this example, shared store 306 may represent at least a portion of a network-attached storage device, a storage area network, a file server, a cloud-based storage device, or any other type or form of storage device that may be accessed by a group of related physical machines.

In the example illustrated in FIG. 3, computing devices 302(1)-(N) may represent any type or form of physical computing device capable of reading computer-executable instructions. Examples of computing devices 302(1)-(N) include, without limitation, laptops, desktops, servers, cellular phones, personal digital assistants (PDAs), multimedia players, embedded systems, combinations of one or more of the same, exemplary computing system 610 in FIG. 6, or any other suitable computing device.

In the example illustrated in FIG. 3, network 304 may represent any medium or architecture capable of facilitating communication or data transfer. Examples of network 304 include, without limitation, an intranet, a wide area network (WAN), a local area network (LAN), a personal area network (PAN), a campus area network (CAN), the Internet, power line communications (PLC), a cellular network (e.g., a GSM Network), exemplary network architecture 700 in FIG. 7, or the like. Network 304 may facilitate communication or data transfer using wireless or wired connections. In one example, computing devices 302(1)-(N) may access or communicate with shared store 306 via network 304 using TCP/IP communication protocols.

Figure 4:
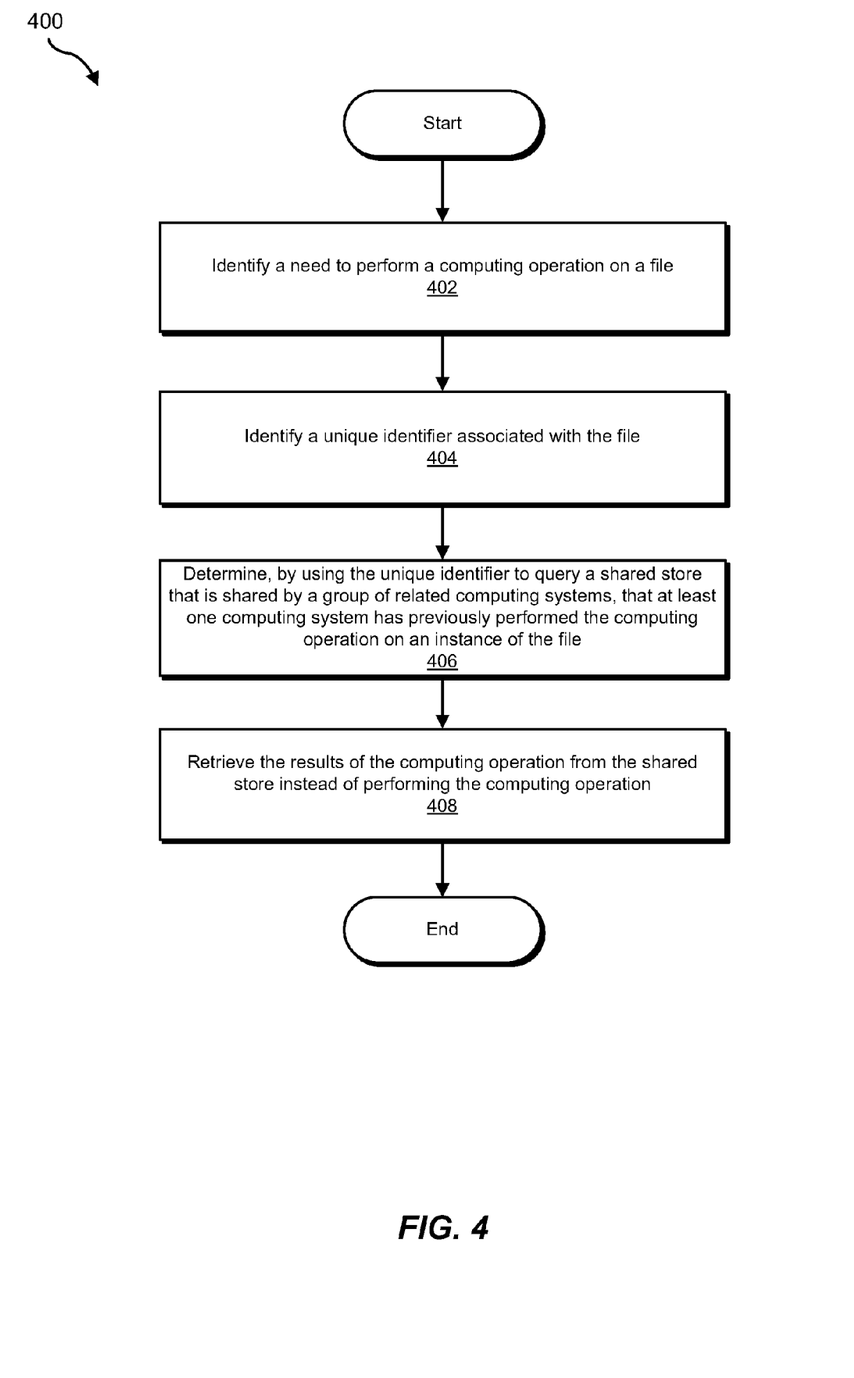
FIG. 4 is a flow diagram of an exemplary method for sharing the results of computing operations among related computing systems.

FIG. 4 is a flow diagram of an exemplary computer-implemented method 400 for sharing the results of computing operations among related computing systems. The steps shown in FIG. 4 may be performed by any suitable computer-executable code and/or computing system. In some embodiments, the steps shown in FIG. 4 may be performed by one or more of the components of system 100 in FIG. 1, host machine 200 in FIG. 2, system 300 in FIG. 3, computing system 610 in FIG. 6, and/or portions of exemplary network architecture 700 in FIG. 7.

As illustrated in FIG. 4, at step 402 one or more of the various systems described herein may identify a need to perform a computing operation on a file. For example, operation-identification module 104 in FIG. 1 may, as part of virtual machine 202(1) in FIG. 2, identify a need to perform a computing operation on a file within a virtual machine 202(1) (e.g., a file stored in storage space within storage device 210 that has been allocated to virtual machine 202(1) by virtualization layer 204).

The computing operation identified by operation-identification module 104 in step 402 may represent any type or form of computing operation performed in connection with a file that consumes computing resources. Examples of computing operations that may be identified by operation-identification module 104 in step 402 include, without limitation, a malware analysis of a file (in order to, for example, determine whether a file is malicious), a data-loss-prevention analysis of a file (in order to, for example, determine whether a file contains sensitive information), a community-based-reputation lookup for a file (in order to, for example, determine the trustworthiness or reputation of a file within a community), a file-type analysis of a file, or any other type or form of computing operation that may be performed on or in connection with a file.

Returning to FIG. 4, at step 404 one or more of the systems described herein may identify a unique identifier associated with the file. For example, file-identification module 106 in FIG. 1 may, as part of virtual machine 202(1) in FIG. 2, identify a unique identifier associated with the file identified in step 402. The term "unique identifier," as used herein, generally represents any type or form of method for uniquely identifying files. Examples of unique file identifiers include, without limitation, file hashes, such as MD5 hashes, SHA-1 hashes, SHA-256 hashes, or the like.

The systems described herein may perform step 404 in a variety of ways. In one example, file-identification module 106 in FIG. 1 may identify a unique identifier associated with a file by creating a hash of the file. For example, file-identification module 106 may, as part of virtual machine 202(1), create a hash of a file when it first encounters the file. In one example, file-identification module 106 may then store this hash within a local store 212(1) associated with virtual machine 202(1). In this example, file-identification module 106 may retrieve the hash for this file from local store 212(1) when it subsequently encounters the file, as opposed to again creating a hash for the file.

As detailed above, virtual machines 202(1)-(N) may store a variety of information within local stores 212(1)-(N). Examples of the types of information that virtual machines 202(1)-(N) may store within local stores 212(1)-(N) include, without limitation, file metadata, such as the hash of a file, the date of at least one computing operation performed in connection with the file (such as the most-recent malware-scan date of a file), file-ancestry information for a file, or any other potentially useful information.

In some embodiments, file metadata for a file within local stores 212(1)-(N) may persist so long as the file remains static or unchanged. For example, upon first encountering a file, file-identification module 106 in FIG. 1 may create and store various file metadata (such as a file hash) for a file within local store 212(1). In this example, the file metadata associated with this file may remain within local store 212(1) so long as the file remains unchanged. However, if file-identification module 106 determines (via, for example, a file system minifilter) that the file has changed, then file-identification module 106 may clear or delete all file metadata associated with the changed or modified file from local store 212(1). In this way, file-identification module 106 may confidently and efficiently reuse file metadata (such as file hashes) stored within local stores 212(1) and may only recalculate or regenerate file metadata for new files or new versions of files.

Since the computing resources required to uniquely identify a file may equal or exceed the computing resources required to share the results of a computing operation performed on a file (e.g., hashing a file may consume as much or more computing resources than performing a malware scan on the same file), in some examples the systems described herein may only perform steps 404-408 on a select portion of files encountered by virtual machines 202(1)-(N) (i.e., the systems described herein may only uniquely identify and share the results of computing operations performed in connection with files that satisfy specific criteria). For example, file-identification module 106 may, prior to performing step 404 in FIG. 4: 1) determine whether an additional instance of the file identified in step 402 is likely to be located on at least one additional computing system within a group of related computing systems (thereby potentially indicating whether one or more computing systems within the group of related computing systems is likely to have encountered an instance of the file identified in step 402 and/or previously performed the desired computing operation identified in step 402 on an instance of the file) and/or 2) determine whether the file identified in step 402 is unlikely to change frequently (thereby potentially indicating whether future resource-consuming file-hash operations may need to be frequently performed on the file).

For example, if file-identification module 106 determines that a file is located in a directory or location that is likely to contain non-user-generated files (such as "C:/Windows/System32/" or "C:/Program Files/Microsoft Office/") and/or is not located within a location or directory that is likely to contain user-generated files (such as "C:/Documents and Settings/"), then file-identification module 106 may determine that an additional instance of the file is likely to be located on at least one additional computing system within the group of related computing systems, thus giving rise to the possibility that one or more of the computing systems within the group of related computing systems has previously encountered and/or performed the computing operation identified in step 402 on the file in question.

Similarly, if file-identification module 106 determines that: 1) a file is located in a directory or location that is commonly associated with static or unchanging files (such as "C:/Windows/System32/"), 2) a file has changed less than a predetermined number of times within a predetermined period of time (e.g., less than five times within a one year period), and/or 3) a file has remained static over a predetermined period of time (e.g., one year), then file-identification module 106 may determine that the file is unlikely to change frequently, thus potentially indicating that relatively few resource-consuming file-hash operations may need to be performed on the file in the future.

In the above examples, if file-identification module 106 determines that a file is unlikely to change frequently and/or that additional instances of a file are likely to be located within a group of related computing systems, then file-identification module 106 may perform step 404 in FIG. 4 (by, e.g., identifying or creating a hash for the file) and allow the continuation of exemplary method 400. However, if file-identification module 106 determines that the file is likely to change frequently and/or that additional instances of a file are unlikely to be located within the group of related computing systems, then exemplary method 400 may terminate upon conclusion of step 402 (e.g., file-identification module 106 may refrain from identifying or creating a hash of the file) since the computing resources required to perform steps 404-408 may equal or exceed the collective computing resources saved by the group by performing steps 404-408.

Returning to FIG. 4, at step 406 one or more of the systems described herein may determine, by using the unique identifier identified in step 404 to query a shared store that is shared by a group of related computing systems, that at least one computing system within the group of related computing systems has previously performed the desired computing operation on an instance of the file. For example, query module 108 in FIG. 1 may, as part a virtual machine 202(1) in FIG. 2, use the unique identifier associated with the file identified in step 404 to query shared store 216 in order to determine whether an additional virtual machine within group 220 has previously performed the computing operation identified in step 402 on an instance of the file.

As detailed above, a shared store may be shared or accessed by a group of related computing systems, such as virtual machines 202(1)-(N) in FIG. 2 and/or computing devices 302(1)-(N). In some examples, these computing systems may share file metadata associated with a file with other computing systems within their related group by storing this file metadata within the shared store. For example, virtual machines 202(1)-(N) in FIG. 2 and/or computing devices 302(1)-(N) may store file metadata for files encountered by virtual machines 202(1)-(N) in FIG. 2 and/or computing devices 302(1)-(N) within shared stores 216 and 306, respectively. Examples of the type of information that virtual machines 202(1)-(N) in FIG. 2 and/or computing devices 302(1)-(N) may respectively store within shared stores 216 and 306 include, without limitation: 1) a hash of a file, 2) the results of at least one computing operation performed in connection with a file (such as a classification assigned to a file during a malware analysis, at least one rationale for a classification assigned to a file during a malware analysis, at least one virus definition set or heuristic used when performing a malware analysis on a file, or the like), 3) the date of at least one computing operation performed in connection with a file (such as the date of the most-recent malware scan performed on a file), and/or 4) any other potentially useful information that may be shared among related computing systems.

As detailed above, any type or form of group of related computing systems may share or access a shared store. Examples of the types of groups of related computing systems that may share or access a shared store include, without limitation, a plurality of virtual machines running on a common host computing device (such as the group of related computing systems 220 running on host machine 200 in FIG. 2), a plurality of physical machines located within a common network (e.g., the group of related computing systems 320 in communication with one another via network 304 in FIG. 3), or any other group of related computing system.

Depending on the type of computing systems involved, this shared store may represent at least a portion of a network-attached storage device, a storage area network, a file server, a cloud-based storage device, a secured partition of a local storage device managed by a hypervisor (e.g., secured partition 214 in FIG. 2, which may be accessed by shared process 206 within virtualization layer 204), or the like. Access to this shared store may depend on the type of computing systems involved. For example, physical machines located within a LAN may communicate with a shared store located on a network-attached storage device or storage area network using TCP/IP communication protocols. Alternatively, virtual machines located on a common host machine may communicate with a shared store located within a secured partition managed by a hypervisor via a secure process running within a virtualization layer. In some examples, this shared store may be indexed based on file hashes.

In some examples, the computing systems may only access this shared store via a secure communication mechanism in order to prevent spoofing and/or tampering. For example, virtual machines located on a common host machine may only access a shared store located within a secured partition managed by a hypervisor via a secure process running within a virtualization layer. Similarly, physical machines connected to a common network may only communicate with a shared store located on a network-attached storage device or storage area network using secure (e.g., encrypted) communication protocols. In some examples, the robustness and/or aggressiveness of the secure communication mechanism may depend on the size of the group of related computing systems, since the larger the size of the group of related computing systems, the more burdensome the secure communication mechanism may become.

As detailed above, related computing systems may use file hashes to query a shared store in order to determine whether an additional physical or virtual machine has previously performed a desired computing operation on a specific file. For example, virtual machine 202(1) may query shared store 216 using a hash of a specific file in order to determine whether one or more of virtual machines 202(1)-(N) has previously performed a desired computing operation on the file. If shared store 216 indicates that none of virtual machines 202(1)-(N) has previously performed the desired computing operation on the file in question (e.g., if shared store 216 does not contain file metadata for the file in question or does not contain the results of a desired computing operation performed on the file in question), then virtual machine 202(1) may perform the desired computing operation on the file in question and then update shared store 202(1) with the results of the computing operation (by, e.g., storing file metadata, such as a hash of the file in question and the results of the computing operation performed on the file in question, within shared store 216).

At a later point in time, virtual machine 202(N) may determine, by querying shared store 216 prior to performing a desired computing operation on an additional instance of the same file, that a related computing system (in this case, virtual machine 202(N)) previously performed the desired computing operation on an instance of the file in question. In this example, virtual machine 202(N) may retrieve the results of the desired computing operation from shared store 216 instead of again performing the computing operation, as will be explained in connection with step 408 below.

If the file in question later changes, and if virtual machine 202(1) later identifies a need to perform a computing operation on the modified or changed file, then virtual machine 202(1) may again query shared store 216 using a new hash of the modified or changed file in order to determine whether one or more of virtual machines 202(1)-(N) has previously performed the desired computing operation on the changed file. As with before, if shared store 216 indicates that none of virtual machines 202(1)-(N) has previously performed the desired computing operation on the changed file (i.e., if shared store 216 does not contain file metadata for the changed file or does not contain the results of a desired computing operation performed on the changed file), then virtual machine 202(1) may perform the desired computing operation on the changed file and then update shared store 202(1) with the results of the computing operation.

In the above example, shared store 216 may contain file metadata (such as file hashes and the results of computing operations) for both the original, unchanged file and the changed or modified file. As such, one or more of virtual machines 202(1)-(N) may determine, by querying shared store 216 using hashes of the original or changed files, whether an additional virtual machine within virtual machines 202(1)-(N) has previously performed a desired computing operation on either the original file or the changed file.

Figure 5:
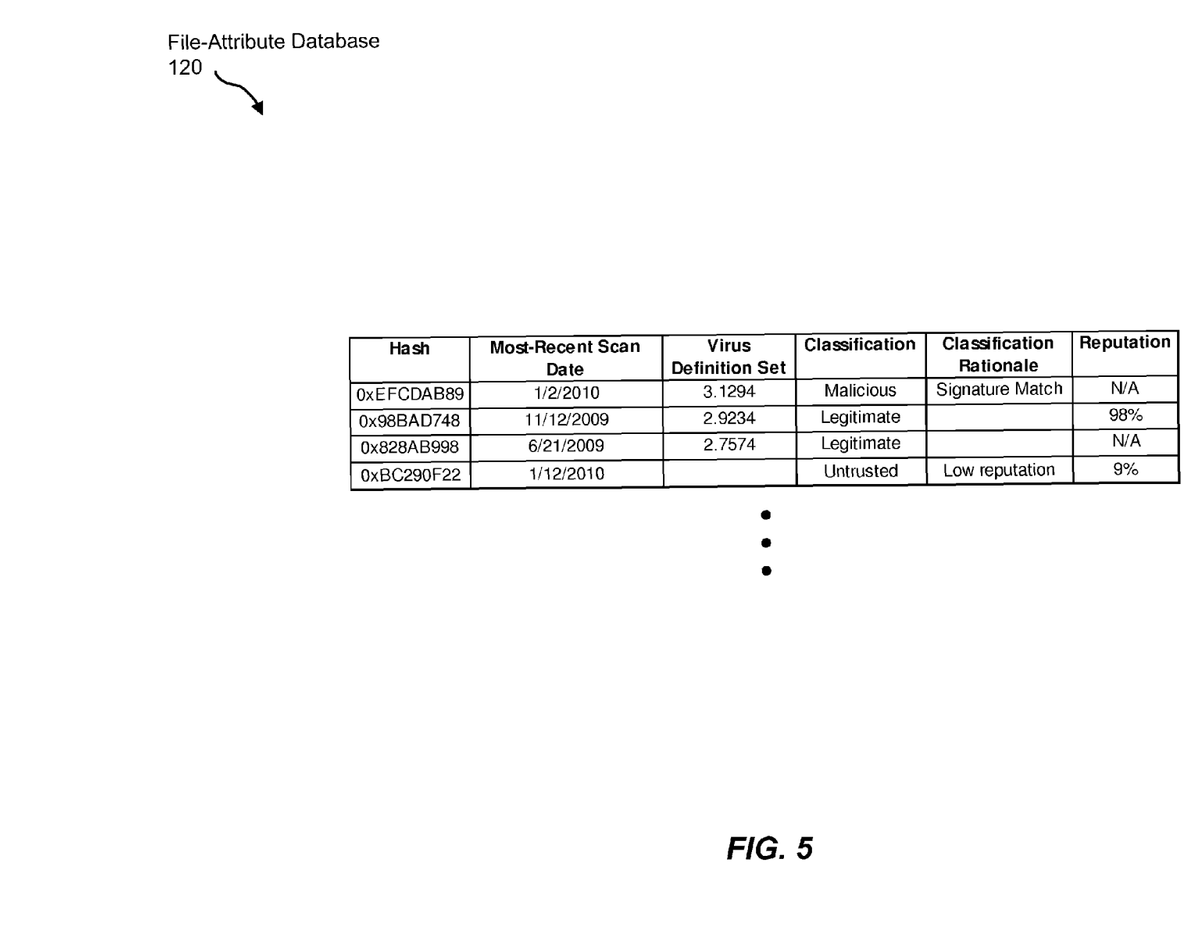
FIG. 5 is an illustration of an exemplary file-attribute database.

FIG. 5 is an exemplary illustration of a file-attribute database 120 that may, as detailed above, represent a portion of a shared store, such as shared stores 216 and 306 in FIGS. 2 and 3, respectively. As illustrated in FIG. 5, file-attribute database 120 may contain information that identifies, for each of a plurality of files: 1) a hash of the file, 2) a most-recent scan date for the file, 3) a virus definition set used during the most-recent scan of the file, 4) a classification assigned to the file during the scan, 5) at least one rationale for the classification assigned to the file during the scan, and 6) community-based reputation information for the file.

In some examples, a physical or virtual machine within a group of related physical or virtual machines may access file-attribute database 120 within a shared store in order to determine whether an additional physical or virtual machine has previously performed a desired computing operation on a specific file. For example, query module 108 in FIG. 1 may, as part of virtual machine 202(1) in FIG. 2, query shared store 216 containing file-attribute database 120 in order to determine whether an additional virtual machine within group 220 has previously performed a malware scan on a file having the hash "0xEFCDAB89." In this example, query module 108 may determine, by querying file-attribute database 120 within shared store 216 using the hash "0xEFCDAB89," that an additional virtual machine within group 220 previously performed a malware scan on the file in question on Jan. 2, 2010 and determined that the file in question represents a malicious file due to a signature match within virus definition set 3.1294. In this example, because file-attribute database 120 contains the results of a malware scan performed on the file in question, query module 108 may proceed to step 408 in FIG. 4.

In some examples, if query module 108 determines, by querying file-attribute database 120 within a shared store, that an additional computing system within the group of related computing system has previously performed a malware scan on the file in question, then query module 108 may also determine whether the virus definition set or heuristic used during this previous malware scan is identical to, similar to, or more current than the virus definition set or heuristic to be used by the computing system in question. For example, if query module 108 determines, as part of virtual machine 202(1) in FIG. 2, that a prior virtual machine has previously performed a malware scan on the file identified in step 402, then query module 108 may determine (by, e.g., analyzing information contained within file-attribute database 120 within shared store 216) whether the virus definition set or heuristic used by this prior virtual machine is identical to, similar to, or more current than the virus definition set or heuristic currently installed or in use by virtual machine 202(1). If so, then query module 108 may proceed to step 408 in exemplary method 400.

However, if query module 108 determines that the virus definition set or heuristic used by the prior virtual machine is different from or older than the virus definition set or heuristic installed or in use by virtual machine 202(1), then query module 108 may instruct virtual machine 202(1) to perform a new malware scan on the file in question. In this example, query module 108 may update shared store 216 with the results of this new malware scan upon completion of the same by virtual machine 202(1).

Returning to FIG. 4, at step 408 one or more of the systems described herein may retrieve the results of the desired computing operation from the shared store instead of again performing the computing operation. For example, query module 108 in FIG. 1 may, as part of virtual machine 202(1) FIG. 2, retrieve the results of the malware scan performed on the file having a hash of "0xEFCDAB89" from file-attribute database 120 within shared store 216. Query module 108 may then instruct virtual machine 202(1) to use these results instead of performing an additional malware scan on the file in question. Upon completion of step 408, exemplary method 400 FIG. 4 may terminate.

As detailed above, by storing the results of resource-consuming computing operations (such as malware scans or file-reputation lookups) performed on common or shared files within a store that is shared by a group of related computing systems, the systems and methods described herein may enable related computing systems (such as a group of virtual machines running on a host machine or a group of physical computing devices connected to a common network) to share and reuse the results of such computing operations. As such, these systems and methods may reduce the number of redundant computing operations performed on files that are shared in common among the group, potentially reducing the amount of computing resources collectively consumed by the group.

Moreover, by only sharing the results of computing operations performed on instances of files that are likely to be encountered by other computing systems within the group and/or that are unlikely to frequently change, the systems and methods described herein may attempt to ensure that the computing resources required to share the results of computing operations performed on such files do not equal or exceed the computing resources collectively saved by sharing the results of such computing operations.

Figure 6:
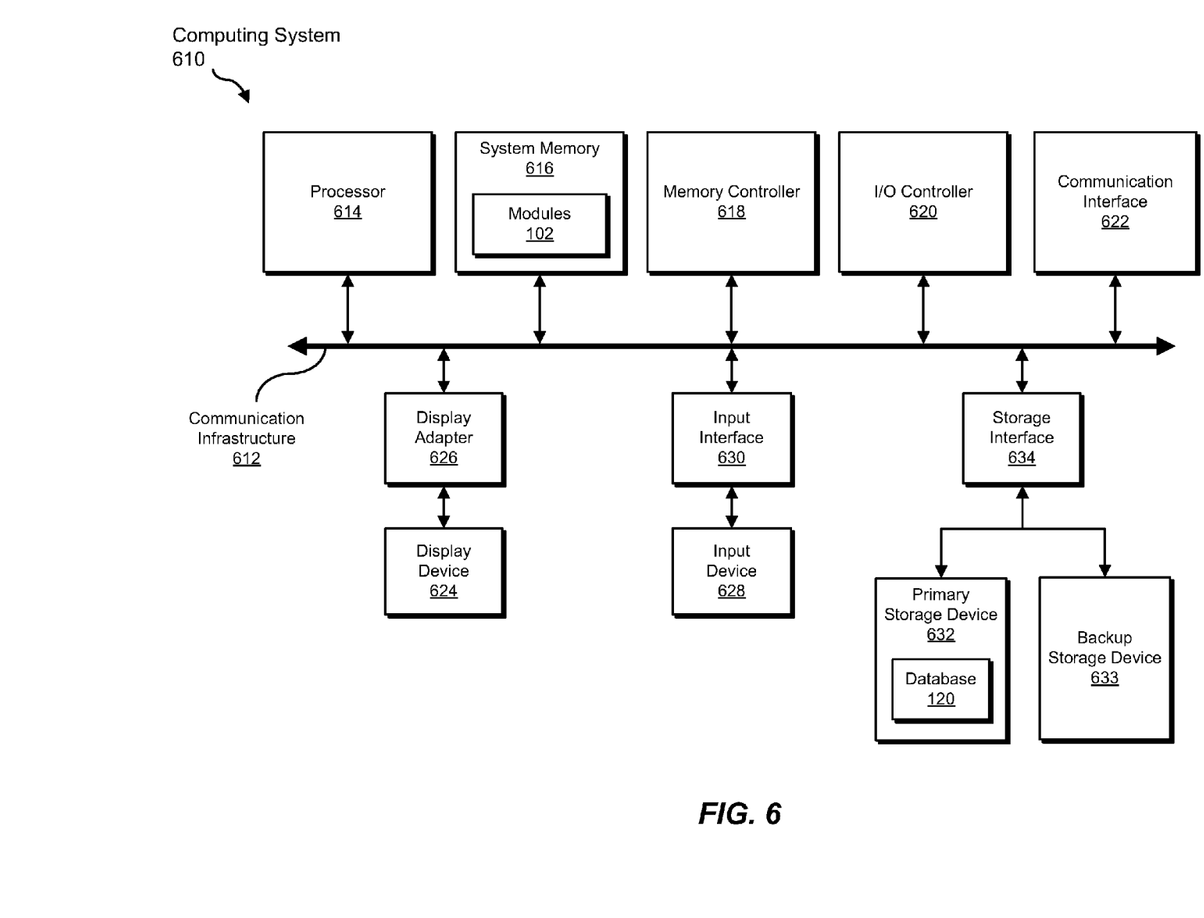
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, determining, using, retrieving, creating, receiving, clearing, performing, and updating steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, determining, using, retrieving, creating, receiving, clearing, performing, and updating.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, determining, using, retrieving, creating, receiving, clearing, performing, and updating steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, determining, using, retrieving, creating, receiving, clearing, performing, and updating steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, determining, using, retrieving, creating, receiving, clearing, performing, and updating steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, file-attribute database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, determining, using, retrieving, creating, receiving, clearing, performing, and updating steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions.

Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
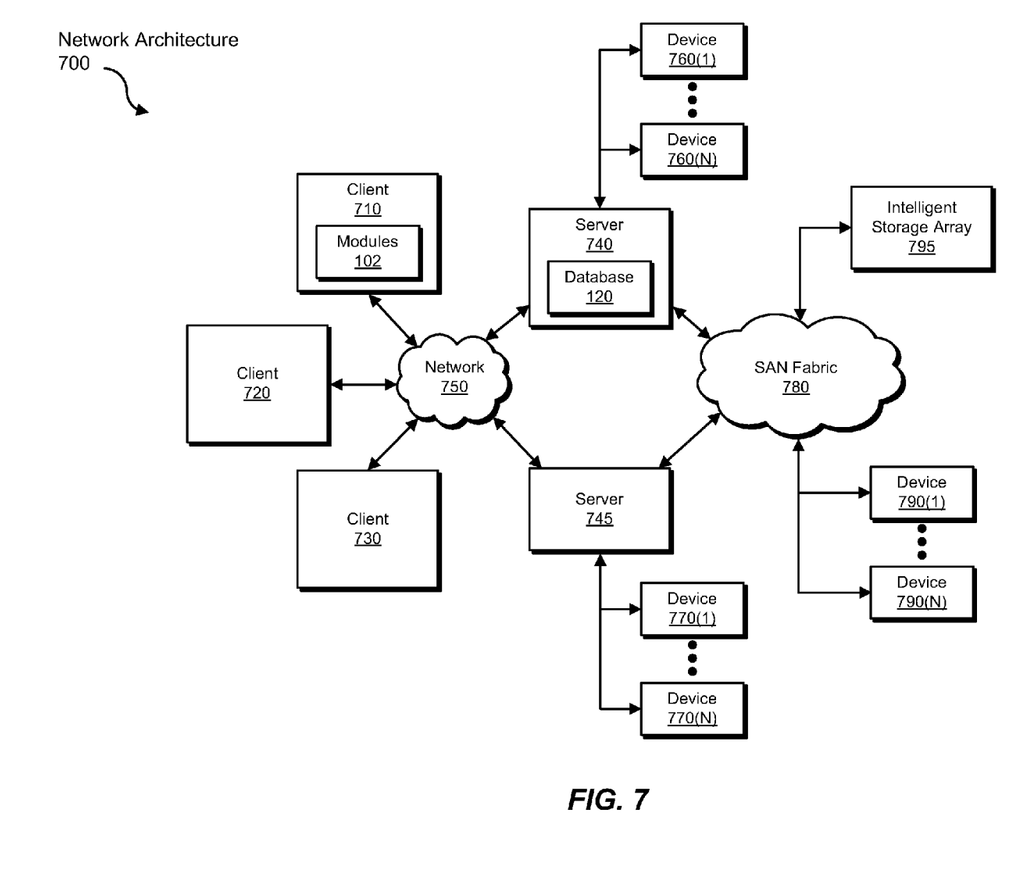
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 may include modules 102 from FIG. 1 and/or servers 740 and/or 745 may include file-attribute database 120 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, determining, using, retrieving, creating, receiving, clearing, performing, and updating steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for sharing the results of computing operations among related computing systems. In one example, this method may include: 1) identifying a need to perform a computing operation on a file, 2) identifying a unique identifier associated with the file, 3) determining, by using the unique identifier to query a shared store that is shared by a group of related computing systems, that at least one computing system within the group of related computing systems has previously performed the computing operation on an instance of the file, and then 4) retrieving the results of the computing operation from the shared store instead of performing the computing operation.

In one example, identifying a unique identifier associated with the file may include identifying a hash of the file. In this example, identifying a hash of the file may include creating the hash and/or retrieving the hash from a local store. The method may also include determining that the file has been modified and then clearing information associated with the file from the local store.

In some examples, the method may also include, prior to identifying a unique identifier associated with the file, determining that an additional instance of the file is likely to be located on at least one additional computing system within the group of related computing systems and/or determining that the file is unlikely to change frequently. In these examples, determining that an additional instance of the file is likely to be located on at least one additional computing system within the group of related computing systems may include determining that the file is located in a location that is likely to contain non-user-generated files and/or determining that the file is not located in a location that is likely to contain user-generated files. Similarly, determining that the file is unlikely to change frequently may include determining that the file is located in a location that is commonly associated with static files, determining that the file has changed less than a predetermined number of times within a predetermined period of time, and/or determining that the file has remained static over a predetermined period of time.

Examples of the computing operation include, without limitation, a malware analysis of the file, a data-loss-prevention analysis of the file, a community-based-reputation lookup for the file, and/or a file-type analysis of the file. The shared store may contain a hash of the file, the results of at least one computing operation performed in connection with the file, and/or the date of at least one computing operation performed in connection with the file. In addition, the results of the computing operation may include information that identifies a classification assigned to the file during a malware analysis, at least one rationale for the classification assigned to the file during the malware analysis, and/or at least one virus definition set or heuristic used when performing the malware analysis.

In some examples, determining that at least one computing system within the group of related computing systems has previously performed the computing operation on an instance of the file may include determining that at least one computing system within the group of related computing systems has previously performed a malware analysis on an instance of the file using an identical, similar, or more-recent virus definition set or heuristic.

In some examples, the shared store may include at least a portion of a network-attached storage device, a storage area network, a file server, a cloud-based storage device, and/or a secured partition of a local storage device managed by a hypervisor. The shared store may also be indexed based on file hashes. In addition, the group of related computing systems may include a plurality of virtual machines running on a common host computing device and/or a plurality of physical machines connected to a common network.

In one example, the method may also include: 1) identifying a need to perform an additional computing operation on the file, 2) determining, by using the unique identifier to query the shared store, that the additional computing operation has not been previously performed on an instance of the file, 3) performing the additional computing operation on the file, and then 4) updating the shared store with the results of the additional computing operation.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, query module 108 in FIG. 1 may transform a property or characteristic of shared stores 216 and 306 in FIGS. 2 and 3 by modifying or storing the results of computing operations performed by related computing systems within such stores.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for sharing the results of computing operations among related computing systems, at least a portion of the method being performed by a computing system comprising at least one processor, the method comprising:

identifying a need to perform a computing operation on a file;

determining that the file satisfies criteria related to potential savings of computing resources within a group of related computing systems, the determination indicating that computing resources required to perform the computing operation on the file will likely exceed computing resources required to identify and share results of the computing operation previously performed by at least one other computing system within the group of related computing systems;

only after determining that the file satisfies the criteria related to potential savings of computing resources within the group of related computing systems, identifying a unique identifier associated with the file;

determining, by using the unique identifier to query a shared store that is shared by the group of related computing systems, that the other computing system within the group of related computing systems has previously performed the computing operation on an instance of the file;

retrieving the results of the computing operation previously performed by the other computing system from the shared store instead of performing the computing operation.

2. The method of claim 1, wherein identifying a unique identifier associated with the file comprises identifying a hash of the file.

3. The method of claim 2, wherein identifying a hash of the file comprises at least one of:
creating the hash;
retrieving the hash from a local store.

4. The method of claim 3, further comprising:
determining that the file has been modified;
clearing information associated with the file from the local store.

5. The method of claim 1, wherein determining that the file satisfies the criteria related to potential savings of computing resources within the group of related computing systems comprises at least one of:
determining that an additional instance of the file is likely to be located on at least one additional computing system within the group of related computing systems;
determining that the file is unlikely to change frequently.

6. The method of claim 5, wherein determining that an additional instance of the file is likely to be located on at least one additional computing system within the group of related computing systems comprises at least one of:
determining that the file is located in a location that is likely to contain non-user-generated files;
determining that the file is not located in a location that is likely to contain user-generated files.

7. The method of claim 5, wherein determining that the file is unlikely to change frequently comprises at least one of:
determining that the file is located in a location that is commonly associated with static files;
determining that the file has changed less than a predetermined number of times within a predetermined period of time;
determining that the file has remained static over a predetermined period of time.

8. The method of claim 1, wherein the shared store contains at least one of:
a hash of the file;
the date of the computing operation performed in connection with the file.

9. The method of claim 8, wherein the results of the computing operation performed in connection with the file comprise information that identifies at least one of:
a classification assigned to the file during a malware analysis;
at least one rationale for the classification assigned to the file during the malware analysis;
at least one virus definition set or heuristic used when performing the malware analysis.

10. The method of claim 1, wherein the computing operation comprises at least one of:
a malware analysis of the file;
a data-loss-prevention analysis of the file;
a community-based-reputation lookup for the file;
a file-type analysis of the file.

11. The method of claim 1, wherein determining that at least one other computing system within the group of related computing systems has previously performed the computing operation on an instance of the file comprises determining that at least one other computing system within the group of related computing systems has previously performed a malware analysis on an instance of the file using:
an identical virus definition set or heuristic;
a similar virus definition set or heuristic;
a more-recent virus definition set or heuristic.

12. The method of claim 1, wherein the shared store comprises at least a portion of at least one of:
a network-attached storage device;
a storage area network;
a file server;
a cloud-based storage device;
a secured partition of a local storage device managed by a hypervisor.

13. The method of claim 1, wherein the shared store is indexed based on file hashes.

14. The method of claim 1, wherein the group of related computing systems comprises:
a plurality of virtual machines running on a common host computing system;
a plurality of physical machines connected to a common network.

15. The method of claim 1, further comprising:
identifying a need to perform an additional computing operation on the file;
determining, by using the unique identifier to query the shared store, that the additional computing operation has not been previously performed on an instance of the file;
performing the additional computing operation on the file;
updating the shared store with the results of the additional computing operation.

16. A system for sharing the results of computing operations among related computing systems, the system comprising:
an operation-identification module programmed to identify a need to perform a computing operation on a file;
a file-identification module programmed to:
determine that the file satisfies criteria related to potential savings of computing resources within a group of related computing systems, the determination indicating that computing resources required to perform the computing operation on the file will likely exceed computing resources required to identify and share results of the computing operation previously performed by at least one other computing system within the group of related computing systems;
only after determining that the file satisfies the criteria related to potential savings of computing resources within the group of related computing systems, identify a unique identifier associated with the file;
a query module programmed to:
determine, by using the unique identifier to query a shared store that is shared by the group of related computing systems, that the other computing system within the group of related computing systems has previously performed the computing operation on an instance of the file;
retrieving the results of the computing operation previously performed by the other computing system from the shared store instead of performing the computing operation;

at least one computer processor configured to execute the operation-identification module, the file-identification module, and the query module.

17. The system of claim 16, wherein the file-identification module determines that the file satisfies the criteria related to potential savings of computing resources within the group of related computing systems by at least one of:
   determining that an additional instance of the file is likely to be located on at least one additional computing system within the group of related computing systems;
   determining that the file is unlikely to change frequently.

18. The system of claim 16, wherein the shared store contains at least one of:
   a hash of the file;
   the date of the computing operation performed in connection with the file.

19. A non-transitory computer-readable-storage medium comprising one or more computer-executable instructions that, when executed by at least one processor of a computing system, cause the computing system to:
   identify a need to perform a computing operation on a file;
   determine that the file satisfies criteria related to potential savings of computing resources within a group of related computing systems, the determination indicating that computing resources required to perform the computing operation on the file will likely exceed computing resources required to identify and share results of the computing operation previously performed by at least one other computing system within the group of related computing systems;
   only after determining that the file satisfies the criteria related to potential savings of computing resources within the group of related computing systems, identify a unique identifier associated with the file;
   determine, by using the unique identifier to query a shared store that is shared by the group of related computing systems, that the other computing system within the group of related computing systems has previously performed the computing operation on an instance of the file;
   retrieve the results of the computing operation previously performed by the other computing system from the shared store instead of performing the computing operation.

20. The computer-readable-storage medium of claim 19, wherein the computing operation comprises at least one of:
   a malware analysis of the file;
   a data-loss-prevention analysis of the file;
   a community-based-reputation lookup for the file;
   a file-type analysis of the file.

* * * * *